US009835152B2

(12) United States Patent
Sakai et al.

(10) Patent No.: US 9,835,152 B2
(45) Date of Patent: Dec. 5, 2017

(54) FLUID PUMP

(71) Applicant: DENSO CORPORATION, Kariya, Aichi-pref. (JP)

(72) Inventors: Hiromi Sakai, Kariya (JP); Daiji Furuhashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 112 days.

(21) Appl. No.: 15/096,630

(22) Filed: Apr. 12, 2016

(65) Prior Publication Data

US 2016/0305425 A1 Oct. 20, 2016

(30) Foreign Application Priority Data

Apr. 14, 2015 (JP) .................................. 2015-82664

(51) Int. Cl.

| | |
|---|---|
| ***F04B 17/00*** | (2006.01) |
| ***F04C 15/00*** | (2006.01) |
| ***F04C 2/344*** | (2006.01) |
| ***F04C 18/344*** | (2006.01) |
| ***F04C 29/00*** | (2006.01) |
| ***F16D 1/08*** | (2006.01) |
| ***F04C 2/10*** | (2006.01) |
| ***F04C 2/08*** | (2006.01) |
| ***F02M 37/04*** | (2006.01) |

(52) U.S. Cl.

CPC ........... *F04C 2/102* (2013.01); *F02M 37/045* (2013.01); *F04C 2/084* (2013.01); *F04C 2/086* (2013.01); *F04C 15/0073* (2013.01); *F04C 2210/1044* (2013.01); *F04C 2230/92* (2013.01); *F04C 2240/30* (2013.01); *F04C 2250/102* (2013.01)

(58) Field of Classification Search

CPC ............ F04C 2230/605; F04C 2270/12; F04C 2/3442

See application file for complete search history.

(56) References Cited

U.S. PATENT DOCUMENTS 9,212,660 B2 * 12/2015 Huser .................. F04C 2/3446

FOREIGN PATENT DOCUMENTS

| | | |
|---|---|---|
| JP | 7-151091 | 6/1995 |
| JP | 2009-174448 | 8/2009 |
| JP | 2011-236864 | 11/2011 |
| JP | 2012-189011 | 10/2012 |
| JP | 2013-60901 | 4/2013 |

* cited by examiner

*Primary Examiner* — Mark Laurenzi
*Assistant Examiner* — Anthony Ayala Delgado
(74) *Attorney, Agent, or Firm* — Nixon & Vanderhye PC

(57) ABSTRACT

An inner wall surface of a pump housing has a slide surface, which is opposite from a joint member and along which an inner rotor is slidable. This slide surface includes an external tooth slide surface and a main body slide surface. External teeth of the inner rotor are slidable along the external tooth slide surface, and a main body of the inner rotor is slidable along the main body slide surface. A surface roughness of the main body slide surface is higher than a surface roughness of the external tooth slide surface.

4 Claims, 9 Drawing Sheets

FLUID PUMP

CROSS REFERENCE TO RELATED APPLICATION

This application is based on and incorporates herein by reference Japanese Patent Application No. 2015-82664 filed on Apr. 14, 2015.

TECHNICAL FIELD

The present disclosure relates to a fluid pump that draws and discharges fluid by changing a volume of respective pump chambers formed between external teeth of an inner rotor and internal teeth of an outer rotor.

BACKGROUND

A previously proposed fluid pump has a rotatable shaft, an inner rotor, an outer rotor, and a pump housing. The inner rotor has a main body, to which the rotatable shaft is coupled, and external teeth, which are formed in an outer peripheral portion of the main body. The outer rotor has internal teeth for meshing with the external teeth. When the inner rotor is rotated by rotating the rotatable shaft, a rotational force of the inner rotor is transmitted from the external teeth to the internal teeth. Thereby, the outer rotor is also rotated. When the inner rotor and the outer rotor are rotated, the volume of the respective pump chambers, which are formed between the external teeth and the internal teeth, changes. In response to increasing of the volume of the pump chamber, the fluid is drawn into the pump chamber. Thereafter, in response to decreasing of the volume of the pump chamber, the fluid is compressed in the pump chamber and is discharged from the pump chamber (see, for example, JP2013-60901A).

In general, when the temperature of the fluid is decreased, viscosity of the fluid is increased. Particularly, in a case where the fluid is light oil (diesel fuel), a wax component (paraffin) of the light oil is solidified to cause very high viscosity of the light oil at the low temperature (e.g., low winter temperatures). In the case where the viscosity of the fluid is increased, a repulsive force, which is applied from the fluid to the inner rotor, is increased. Thereby, a force (tilting force), which is applied from the fluid to the inner rotor in a direction for tilting the inner rotor, is increased. Thereby, a slide resistance between a radial bearing, which rotatably and slidably supports the rotatable shaft, and the rotatable shaft is increased to cause an increase in the energy loss or generation of damage at a sliding portion between the radial bearing and the rotatable shaft.

With respect to the above point, the inventors of the present application have studied a structure for coupling the inner rotor to the rotatable shaft through a joint member rather than directly coupling the inner rotor to the rotatable shaft. With this structure, the above-described tilting force can be absorbed through resilient deformation of the joint member, and thereby the slide resistance between the radial bearing and the rotatable shaft can be reduced.

However, the inventors of the present application have noticed that the above-described coupling structure poses the following new disadvantage. The pump housing has a rotor receiving chamber, which receives the inner and outer rotors. In the case of the above coupling structure, a joint chamber, which receives the joint member, is required separately from the rotor receiving chamber. A joint receiving chamber side surface of the main body of the inner rotor receives a pressure in the axial direction from the fluid in the joint receiving chamber. Thereby, a surface of the inner rotor, which is perpendicular to the axial direction and is located on an axial side opposite from the joint receiving chamber, is urged against an inner wall surface of the pump housing to cause an increase in the slide resistance of the inner rotor.

That is, in the case where the above-described coupling structure is used, although the tilting force can be absorbed by the joint member, the joint receiving chamber is required. Therefore, the increase in the slide resistance of the inner rotor becomes a new disadvantage.

SUMMARY

The present disclosure is made in view of the above disadvantage. According to the present disclosure, there is provided a fluid pump that includes a rotatable shaft, an inner rotor, a joint member, an outer rotor, a pump housing, an external tooth slide surface and a main body slide surface. The inner rotor includes a main body and a plurality of external teeth. The main body has a through-hole, through which the rotatable shaft is inserted. The plurality of external teeth is formed in an outer peripheral portion of the main body. The joint member is placed on an axial side of the inner rotor and couples between the inner rotor and the rotatable shaft to transmit a rotational torque of the rotatable shaft to the inner rotor. The outer rotor has a plurality of internal teeth for meshing with the plurality of external teeth. The pump housing forms a rotor receiving chamber and a joint receiving chamber. The rotor receiving chamber receives the outer rotor and the inner rotor. The joint receiving chamber receives the joint member. The pump housing also forms a plurality of pump chambers between the plurality of internal teeth and the plurality of external teeth. Each of the plurality of pump chambers draws and compresses fluid by changing a volume of the pump chamber. The external tooth slide surface and the main body slide surface are formed in a portion of an inside wall surface of the pump housing located on an opposite side of the inner rotor, which is opposite from the joint member in an axial direction. The plurality of external teeth of the inner rotor is slidable relative to the external tooth slide surface while the main body of the inner rotor is slidable relative to the main body slide surface, and a surface roughness of the main body slide surface is higher than a surface roughness of the external tooth slide surface.

According to the present disclosure, there is also provided a fluid pump that includes a rotatable shaft, an inner rotor, a joint member, an outer rotor, a pump housing, an external tooth slide surface and a main body slide surface. The inner rotor includes a main body and a plurality of external teeth. The main body has a through-hole, through which the rotatable shaft is inserted. The plurality of external teeth is formed in an outer peripheral portion of the main body. The joint member is placed on an axial side of the inner rotor and couples between the inner rotor and the rotatable shaft to transmit a rotational torque of the rotatable shaft to the inner rotor. The outer rotor has a plurality of internal teeth for meshing with the plurality of external teeth. The pump housing forms a rotor receiving chamber and a joint receiving chamber. The rotor receiving chamber receives the outer rotor and the inner rotor. The joint receiving chamber receives the joint member. The pump housing also forms a plurality of pump chambers between the plurality of internal teeth and the plurality of external teeth.

Each of the plurality of pump chambers draws and compresses fluid by changing a volume of the pump chamber. The external tooth slide surface and the main body slide surface are formed in a portion of an inside wall surface of the pump housing located on an opposite side of the inner rotor, which is opposite from the joint member in an axial direction. The plurality of external teeth of the inner rotor is slidable relative to the external tooth slide surface while the main body of the inner rotor is slidable relative to the main body slide surface, and a surface roughness of a rotor side main body slide surface of the main body, which is slidable relative to the main body slide surface, is higher than a surface roughness of a rotor side external tooth slide surface of the plurality of external teeth, which is slidable relative to the external tooth slide surface.

BRIEF DESCRIPTION OF THE DRAWINGS

The drawings described herein are for illustration purposes only and are not intended to limit the scope of the present disclosure in any way.

DETAILED DESCRIPTION

Embodiments of a fluid pump according to the present disclosure will be described with reference to the accompanying drawings.

First Embodiment

The fluid pump of the present embodiment is installed in a vehicle. A subject fluid to be pumped with the fluid pump is liquid fuel used for combustion in an internal combustion engine. Specifically, in the present embodiment, light oil (diesel fuel), which is used for combustion in a compression self-ignition internal combustion engine, is used as the subject fluid to be pumped. The fluid pump is received in an inside of a fuel tank.

Figure 1:
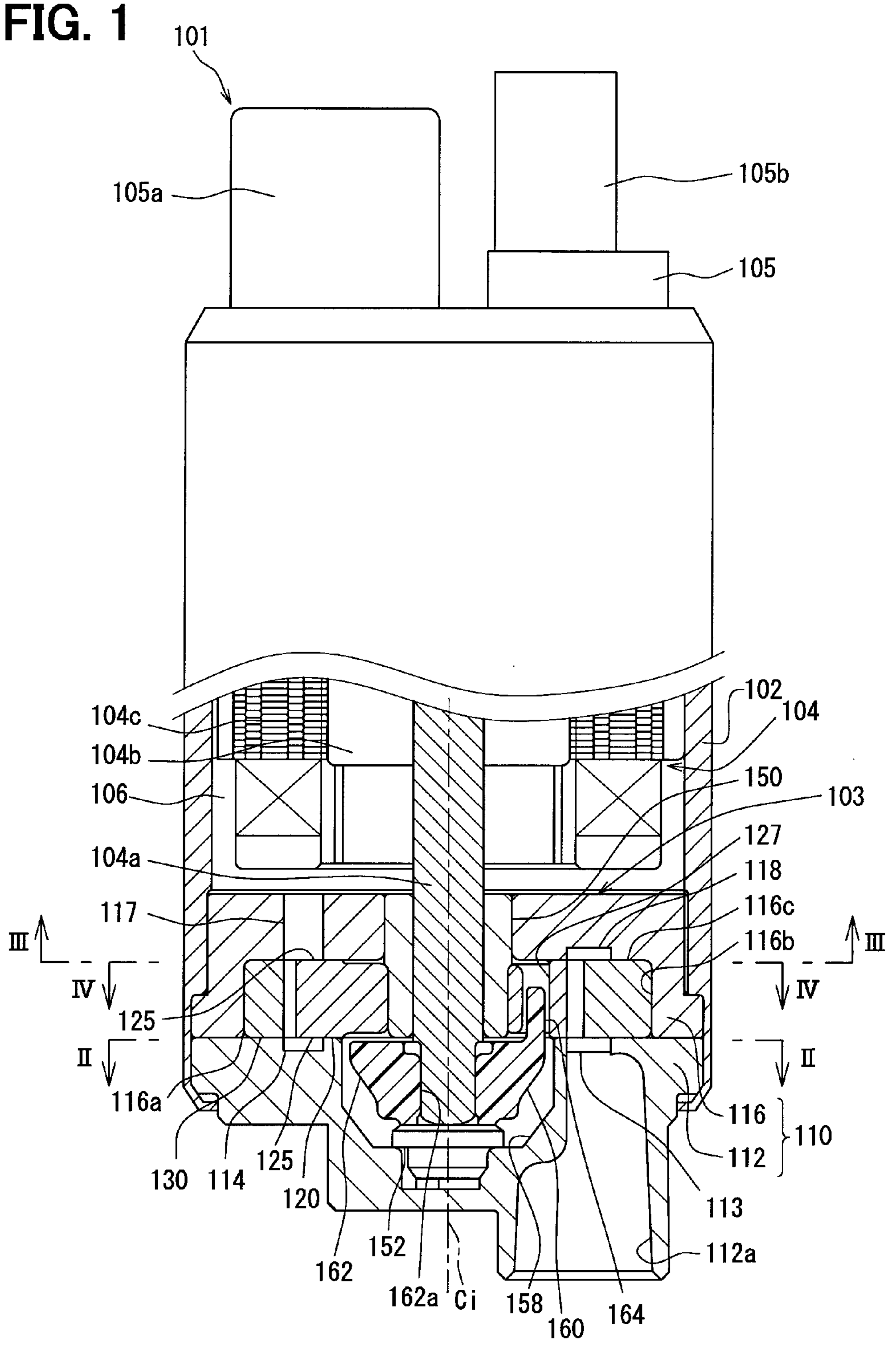
FIG. 1 is a partial cross-sectional view indicating a fuel pump according to a first embodiment of the present disclosure.

As shown in FIG. 1, the fluid pump 101 of the present embodiment is a rotary internal gear pump of a positive displacement type. The fluid pump 101 includes a pump body 102, a pump main body 103, an electric motor 104 and a side cover 105. The pump main body 103 and the electric motor 104 are received in an inside of the pump body 102, which is shaped into a cylindrical tubular form, such that the pump main body 103 and the electric motor 104 are arranged one after another in an axial direction. The side cover 105 is installed to an opening of one of two axially opposite end parts of the pump body 102, which is located on the electric motor 104 side.

The side cover 105 includes an electric connector **105*a*, which supplies an electric power to the electric motor 104, and a discharge port 105*b*, through which fuel is discharged from the fluid pump 101. In the fluid pump 101, a rotatable shaft 104*a* of the electric motor 104 is rotated when the electric power is supplied from an external circuit through the electric connector 105*a*. Thus, an outer rotor 130 and an inner rotor 120 of the pump main body 103 are rotated by a drive force of the rotatable shaft 104*a* of the electric motor 104, and thereby fuel is drawn into and compressed in the fluid pump 101 and is then discharged from the fluid pump 101 through the discharge port 105*b*. The fluid pump 101** pumps the light oil, which has the higher viscosity in comparison to gasoline, as the fuel.

In the present embodiment, the electric motor 104 is an inner rotor brushless motor and includes magnets **104*b*, which form four magnetic poles, and coils 104*c*, which are installed in six slots. For example, at a start preparation time (e.g., a time of turning on of an ignition switch of the vehicle), a positioning control operation of the electric motor 104 is executed to rotate the rotatable shaft 104*a* toward a drive rotation side or a counter-drive rotation side (the counter-drive rotation side being opposite from the drive rotation side). Thereafter, the electric motor 104 executes a drive control operation, which rotates the rotatable shaft 104*a* from the position, at which the rotatable shaft 104*a*** is positioned in the positioning control operation, toward the drive rotation side.

Here, the drive rotation side is a positive direction side of a rotational direction Ri of the inner rotor 120 in a circumferential direction of the inner rotor 120. The counter-drive rotation side is a negative direction side of the rotational direction Ri of the inner rotor 120, which is opposite from the positive direction side.

Hereinafter, the pump main body 103 will be described in detail. The pump main body 103 includes a pump housing 110, the inner rotor 120, the outer rotor 130 and a joint member 160. The pump housing 110 includes a pump cover 112 and a pump casing 116, which are placed one after another in the axial direction.

The pump cover 112 is made of metal and is shaped into a circular disk form. The pump cover 112 axially projects outward from the end part of the pump body 102, which is located on the side of the electric motor 104 that is opposite from the side cover 105.

Figure 2:
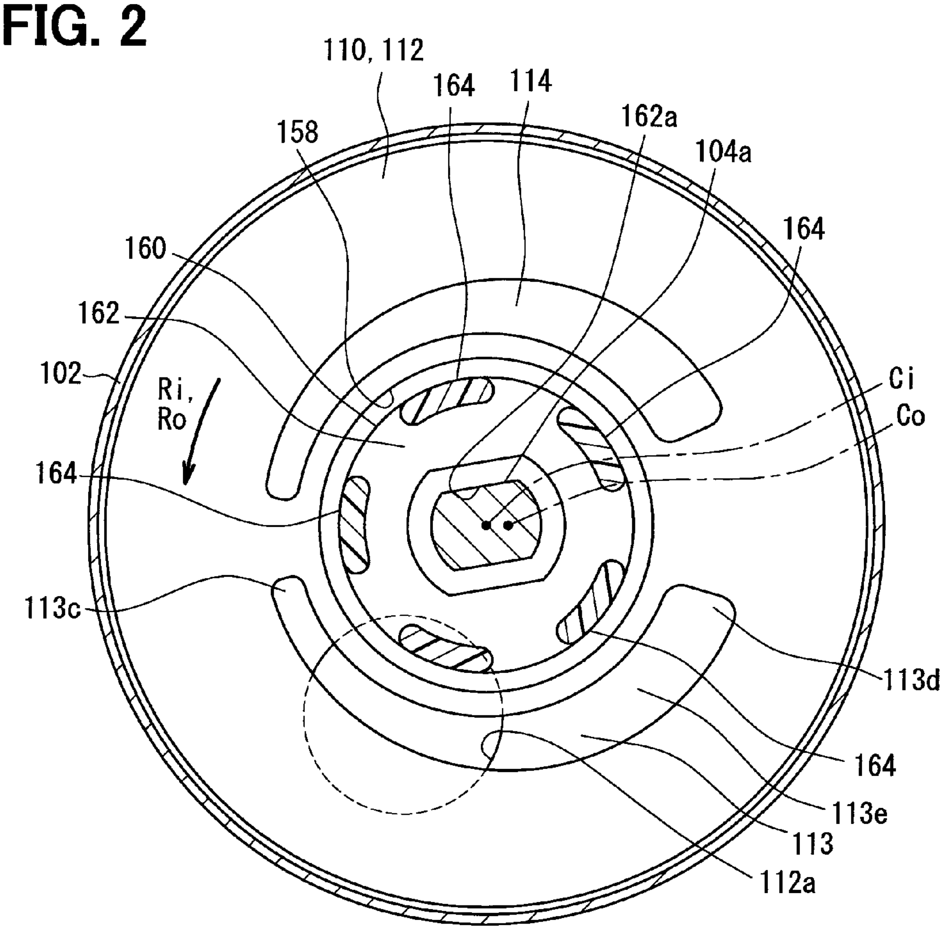
FIG. 2 is a cross-sectional view taken along line II-II in FIG. 1.
Figure 5:
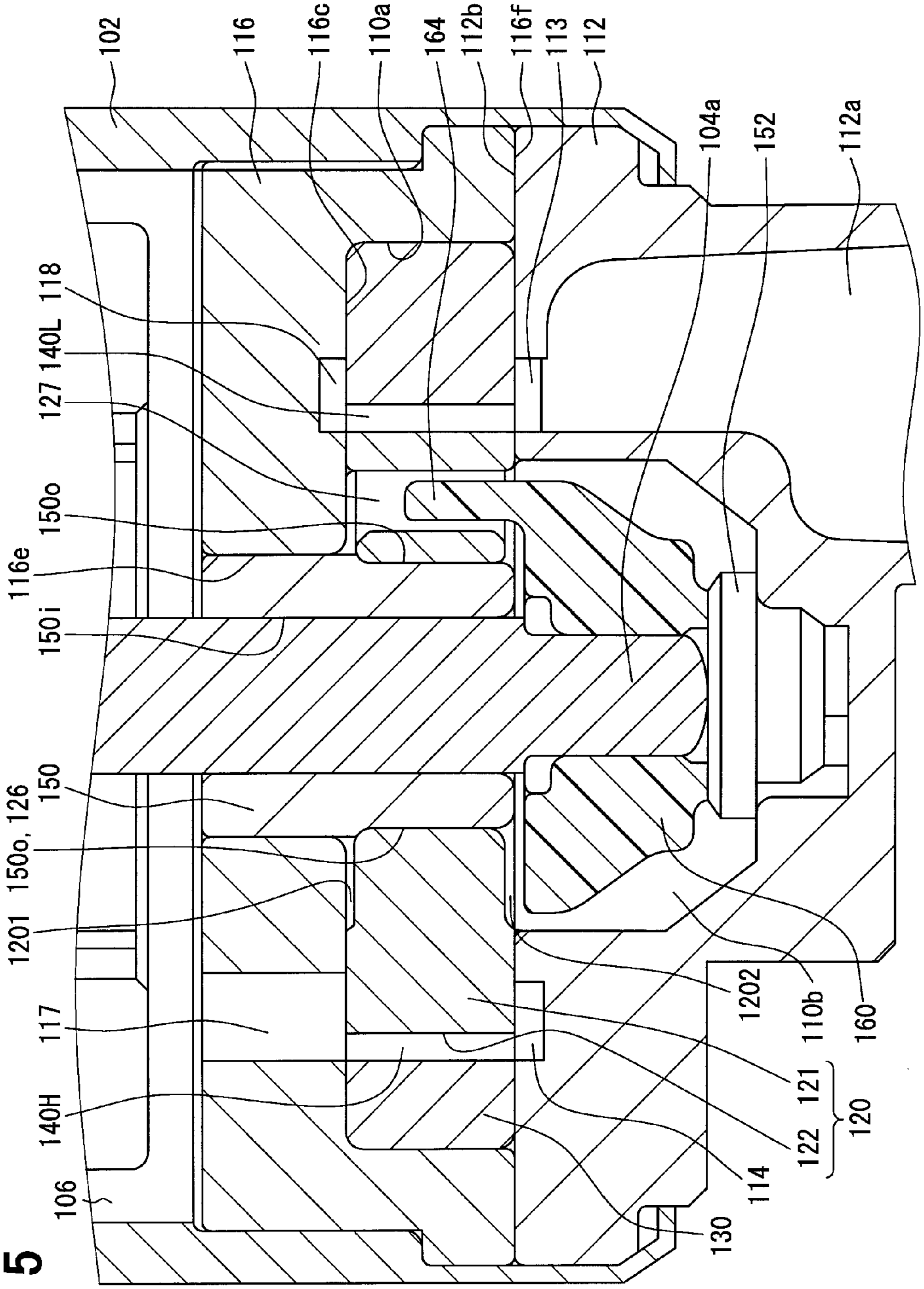
FIG. 5 is a partial enlarged view of FIG. 1.

In order to draw the fuel from an outside of the fluid pump 101, the pump cover 112 shown in FIGS. 1, 2 and 5 has a suction passage **112*a*, which is formed as a cylindrical hole, and a suction groove 113, which is shaped into an arcuate form. The suction groove 113 is axially grooved, i.e., formed in an inside wall surface of the pump cover 112 and opens on the pump casing 116 side of the pump cover 112. The suction passage 112*a* opens in a groove bottom portion 113*e* of the suction groove 113 at a predetermined area, so that the suction groove 113 is communicated with the suction passage 112*a*. A communicating portion of the suction groove 113, which is communicated with the suction passage 112*a*, extends through the pump cover 112** in the axial direction.

A non-communicating portion of the suction groove 113, which is not directly communicated with the suction passage 112*a*, is shaped into a cup form having a bottom. As shown in FIG. 2, the suction groove 113 has a circumferential extent, which is less than one half (less than 180 degrees) of an entire circumference of the inner rotor 120 in the rotational direction Ri (also see FIG. 4). The suction groove 113 extends from a start end part 113*c* to a terminal end part 113*d* in the rotational direction Ri, Ro such that a radial extent (hereinafter referred to as a width) of the suction groove 113, which is measured in a radial direction of the rotational axis, progressively increases in the rotational direction Ri, Ro from the start end part 113*c* to the terminal end part 113*d.*

Furthermore, the pump cover 112 forms a joint receiving chamber 110*b* at an area that is opposed to the inner rotor 120 along a central axis (hereinafter referred to as an inner central axis) Ci of the inner rotor 120. The joint receiving chamber 110*b* is shaped into a recessed hole. A main body 162 of the joint member 160 is rotatably installed in the joint receiving chamber 110*b.*

The pump casing 116 shown in FIGS. 1 and 3-5 is made of metal and is shaped into a cylindrical tubular form having a bottom. An opening portion 116*a* of the pump casing 116 is covered with the pump cover 112 such that an entire circumferential extent of the opening portion 116*a* is tightly closed by the pump cover 112. As shown particularly in FIGS. 1 and 4, an inner peripheral portion 116*b* of the pump casing 116 is formed as a cylindrical hole that is eccentric relative to the inner central axis Ci of the inner rotor 120.

Figure 3:
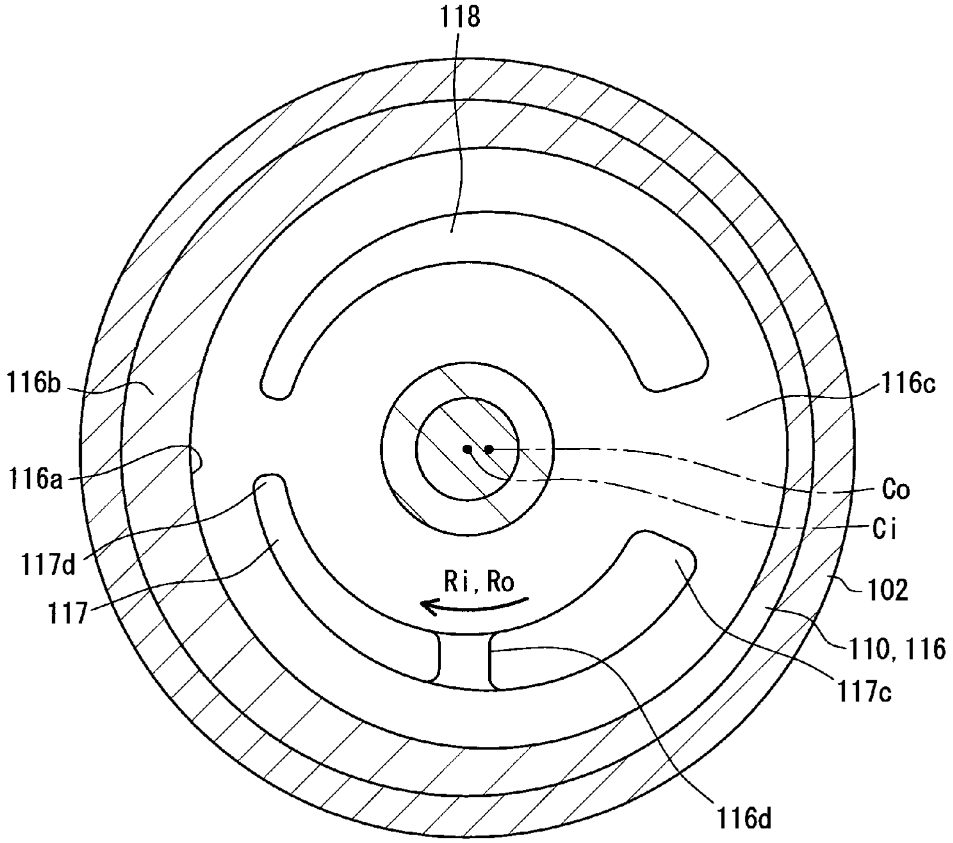
FIG. 3 is a cross-sectional view taken along line III-III in FIG. 1.

The pump casing 116 forms a discharge passage 117, which is formed as an arcuate hole, to discharge the fuel from the discharge port 105*b* through a high pressure passage 106 defined between the pump body 102 and the electric motor 104. The discharge passage 117 axially extends through a recessed bottom portion 116*c* of the pump casing 116. Particularly, as shown in FIG. 3, the discharge passage 117 has a circumferential extent, which is less than one half (i.e., less than 180 degrees) of the entire circumference of the inner rotor 120 in the rotational direction Ri. A radial extent (hereinafter referred to as a width) of the discharge passage 117, which is measured in the radial direction, progressively decreases in the rotational direction Ri, Ro from a start end part 117*c* to an terminal end part 117*d.*

Furthermore, the pump casing 116 includes a reinforcing rib 116*d* in the discharge passage 117. The reinforcing rib 116*d* is formed integrally with the pump casing 116 such that the reinforcing rib 116*d* extends across the discharge passage 117 in a crossing direction, which crosses the rotational direction Ri of the inner rotor 120, and thereby the reinforcing rib 116*d* reinforces the pump casing 116.

An opposing suction groove 118 shown in FIG. 3 is formed in the recessed bottom portion 116*c* of the pump casing 116 at a corresponding area that is opposed to the suction groove 113 in the axial direction while pump chambers 140 (described later in detail) are interposed between the opposing suction groove 118 and the suction groove 113 in the axial direction. The opposing suction groove 118 is an arcuate groove that corresponds to a shape, which is produced by projecting the suction groove 113 onto the pump casing 116 in the axial direction. In this way, in the pump casing 116, the discharge passage 117 is formed to be symmetric to the opposing suction groove 118 with respect to the symmetry axis located between the discharge passage 117 and the opposing suction groove 118. As shown particularly in FIG. 2, an opposing discharge groove 114 is formed in the pump cover 112 at a corresponding area that is opposed to the discharge passage 117 in the axial direction while the pump chambers 140 are interposed between the opposing discharge groove 114 and the discharge passage 117 in the axial direction. The opposing discharge groove 114 is formed as an arcuate groove that is shaped to correspond with a shape, which is produced by projecting the discharge passage 117 onto the pump cover 112 in the axial direction. In this way, in the pump cover 112, the suction groove 113 is formed to be symmetric to the opposing discharge groove 114 with respect to the symmetry axis located between the suction groove 113 and the opposing discharge groove 114. An outline (contour) of the suction groove 113, an outline (contour) of the opposing discharge groove 114, an outline (contour) of the discharge passage 117, and an outline (contour) of the opposing suction groove 118 are shaped to extend in parallel with a rotational path of the external teeth 122 and a rotational path of the internal teeth 132*a*.

As shown in FIG. 1, a radial bearing 150 is securely fitted to the recessed bottom portion 116*c* of the pump casing 116 along the inner central axis Ci to radially support the rotatable shaft 104*a* of the electric motor 104 in a manner that enables rotation of the rotatable shaft 104*a*. Furthermore, a thrust bearing 152 is securely fitted to the pump cover 112 along the inner central axis Ci to axially support the rotatable shaft 104*a* in a manner that enables the rotation of the rotatable shaft 104*a*.

Figure 4:
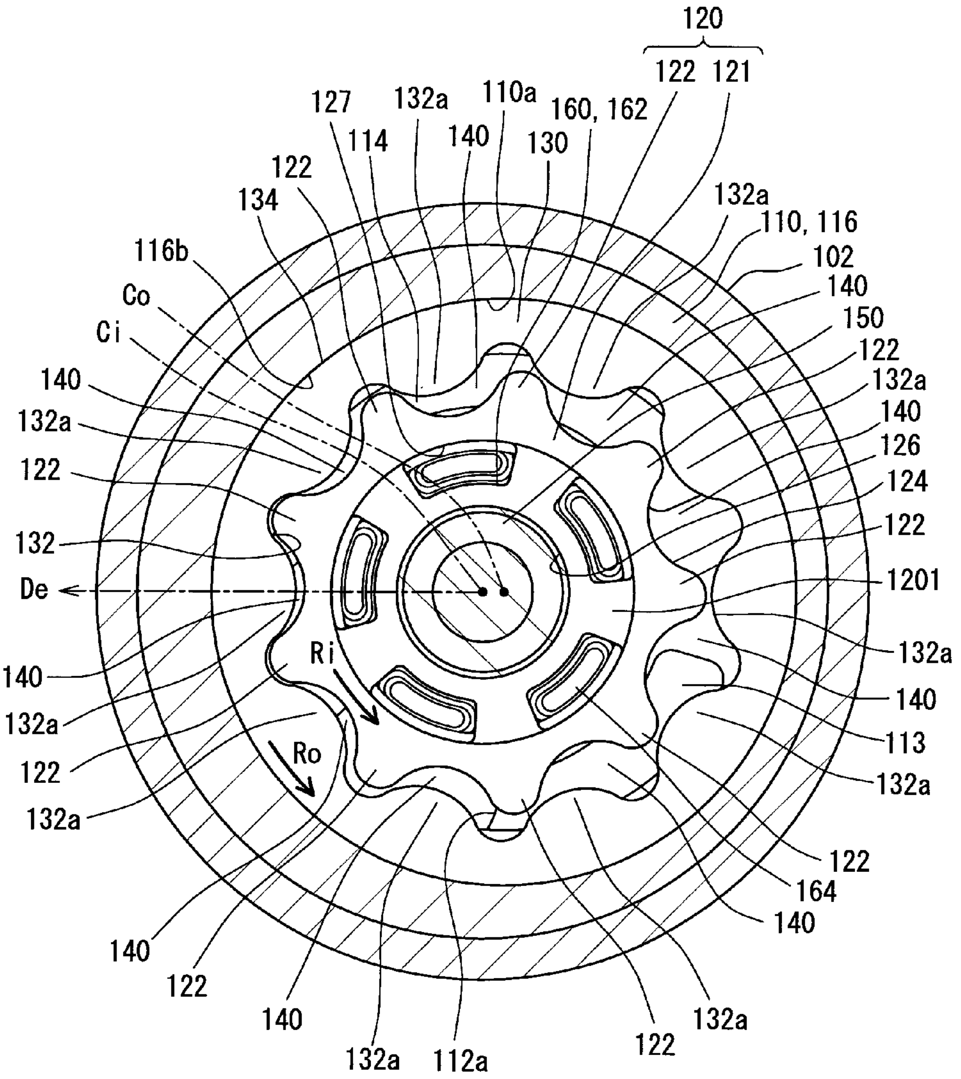
FIG. 4 is a cross-sectional view taken along line IV-IV in FIG. 1.

As shown in FIGS. 1, 4 and 5, a rotor receiving chamber 110*a*, which receives the inner rotor 120 and the outer rotor 130, is formed by the recessed bottom portion 116*c* and the inner peripheral portion 116*b* of the pump casing 116 and the pump cover 112. The inner rotor 120, which is indicated in FIGS. 1 and 4, is centered at the inner central axis Ci and is thereby coaxial with the rotatable shaft 104*a* (i.e., coaxial with a rotational axis of the rotatable shaft 104*a*), so that the inner rotor 120 is eccentrically placed in the rotor receiving chamber 110*a*. A through-hole 126, which receives the radial bearing 150, is formed in a main body 121 of the inner rotor 120. When the inner rotor 120 is rotated, an inner wall surface of the through-hole 126 is slid along a cylindrical outer peripheral surface 150*o* of the radial bearing 150. Thereby, the inner rotor 120 is radially supported by the radial bearing 150 in a rotatable member. Furthermore, two slide surfaces 125 of the inner rotor 120, which are respectively formed at two opposed axial ends of the inner rotor 120, are supported by the recessed bottom portion 116*c* of the pump casing 116 and the pump cover 112, respectively, in a manner that enables rotation of the inner rotor 120.

The inner rotor 120 has a plurality of insertion holes 127 that extend in the axial direction at a corresponding area of the inner rotor 120, which is opposed to the joint receiving chamber 110*b*. In the present embodiment, the number of the insertion holes 127 is five, and these insertion holes 127 are arranged one after another at equal intervals in the circumferential direction along the rotational direction Ri. The insertion holes 127 extend through the inner rotor 120 from the joint receiving chamber 110*b* side to the recessed bottom portion 116*c* side in the axial direction. Legs (projections) 164 of the joint member 160 are inserted into the insertion holes 127, respectively, so that the drive force of the rotatable shaft 104*a* is transmitted to the inner rotor 120 through the joint member 160. Thereby, the inner rotor 120 is rotated in the circumferential direction about the inner central axis Ci in response to the rotation of the rotatable shaft 104*a* of the electric motor 104 while the slide surfaces 125 of the inner rotor 120 are slid along the recessed bottom portion 116*c* and the pump cover 112, respectively.

The inner rotor 120 includes a plurality of external teeth 122, which are formed in an outer peripheral portion 124 of the inner rotor 120 and are arranged one after another at equal intervals in the circumferential direction along the rotational direction Ri. Each of the external teeth 122 can axially oppose the suction groove 113, the discharge passage 117, the opposing discharge groove 114 and the opposing suction groove 118 in response to the rotation of the inner rotor 120. Thereby, it is possible to limit sticking of the inner rotor 120 to the recessed bottom portion 116*c* and the pump cover 112.

As shown in FIGS. 1, 4 and 5, the outer rotor 130 is eccentric to the inner central axis Ci of the inner rotor 120, so that the outer rotor 130 is coaxially received in the rotor receiving chamber 110*a*. In this way, the inner rotor 120 is eccentric to, i.e., is decentered from the outer rotor 130 in an eccentric direction De, which is the radial direction. An outer peripheral portion 134 of the outer rotor 130 is radially supported by the inner peripheral portion 116*b* of the pump casing 116 in a manner that enables rotation of the outer rotor 130. Furthermore, the outer peripheral portion 134 of the outer rotor 130 is axially supported by the recessed bottom portion 116*c* of the pump casing 116 and the pump cover 112 in a manner that enables the rotation of the outer rotor 130. The outer rotor 130 is rotatable in the rotational direction (certain rotational direction) Ro about an outer central axis Co, which is eccentric to the inner central axis Ci.

The outer rotor 130 has a plurality of internal teeth 132*a* for meshing with the external teeth 122 of the inner rotor 120. The internal teeth 132*a* are formed in an inner peripheral portion 132 of the outer rotor 130 and are arranged one after another at equal intervals in the rotational direction Ro. Each of the internal teeth 132*a* can axially oppose the suction groove 113, the discharge passage 117, the opposing discharge groove 114 and the opposing suction groove 118 in response to the rotation of the outer rotor 130. Thereby, it is possible to limit sticking of the outer rotor 130 to the recessed bottom portion 116*c* and the pump cover 112.

A fuel pressure (discharge pressure) in an inside of the discharge passage 117 is axially exerted against the inner rotor 120 and the outer rotor 130 toward the suction passage 112*a*. A fuel pressure in the opposing discharge groove 114 is also the discharge pressure and is axially exerted against the inner rotor 120 and the outer rotor 130 toward the electric motor 104 side. Since the opposing discharge groove 114 is axially opposed to the discharge passage 117, the fuel pressure of the opposing discharge groove 114 and the fuel pressure of the discharge passage 117 are balanced with each other. Therefore, it is possible to limit tilting of the inner rotor 120 and the outer rotor 130, which would be otherwise caused by the discharge pressure.

Similarly, since the opposing suction groove 118 is axially opposed to the suction groove 113, the fuel pressure (the suction pressure) of the opposing suction groove 118 and the fuel pressure (the suction pressure) of the suction groove 113 are balanced with each other. Therefore, it is possible to limit tilting of the inner rotor 120 and the outer rotor 130, which would be otherwise caused by the suction pressure.

The external teeth 122 and the internal teeth 132*a* are shaped to have a trochoid tooth profile. The number of the internal teeth 132*a* is set to be larger than the number of the external teeth 122 by one. The inner rotor 120 is meshed with the outer rotor 130 due to the eccentricity in the eccentric direction De. In this way, the pump chambers 140 are radially formed between the internal teeth 132*a* and the external teeth 122 in the rotor receiving chamber 110*a*. A volume of each pump chamber 140 is increased and decreased through the rotation of the outer rotor 130 and the rotation of the inner rotor 120.

The volume of each of opposing ones of the pump chambers 140, which are axially opposed to and communicated with the suction groove 113 and the opposing suction groove 118, is increased in response to the rotation of the inner rotor 120 and the rotation of the outer rotor 130. Thereby, the fuel is drawn from the suction passage 112*a* into the corresponding pump chambers 140 through the suction groove 113. At this time, since the width (radial extent) of the suction groove 113 progressively increases from the start end part 113*c* to the terminal end part 113*d* in the rotational direction Ri, Ro (also see FIG. 2), the amount of fuel drawn into the pump chamber 140 through the suction groove 113 corresponds to the amount of increase in the volume of the pump chamber 140. The corresponding ones of the pump chambers 140, each of which draws the fuel by increasing its volume in the above-described manner, are referred to as negative pressure portions (or negatively pressurized pump chambers) 140L.

The volume of each of opposing ones of the pump chambers 140, which are axially opposed to and communicated with the discharge passage 117 and the opposing discharge groove 114, is decreased in response to the rotation of the inner rotor 120 and the rotation of the outer rotor 130. Therefore, simultaneously with the suctioning function discussed above, the fuel is discharged from the corresponding pump chamber 140 into the high pressure passage 106 through the discharge passage 117. At this time, since the width (radial extent) of the discharge passage 117 progressively decreases from the start end part 117*c* to the terminal end part 117*d* in the rotational direction Ri, Ro (also see FIG. 3), the amount of fuel discharged from the pump chamber 140 through the discharge passage 117 corresponds to the amount of decrease in the volume of the pump chamber 140. The corresponding ones of the pump chambers 140, each of which compresses the fuel by decreasing its volume in the above-described manner, are referred to as high pressure portions (or highly pressurized pump chambers or positively pressurized pump chambers) 140H.

The joint member 160 is made of synthetic resin, such as poly phenylene sulfide (PPS). The joint member 160 relays the rotatable shaft 104*a* to the inner rotor 120 to rotate the inner rotor 120 in the circumferential direction. The joint member 160 includes the main body 162 and the legs 164.

The main body 162 is installed in the joint receiving chamber 110*b*, which is formed in the pump cover 112. A fitting hole 162*a* is formed in a center of the main body 162, and thereby the main body 162 is shaped into a circular ring form. When the rotatable shaft 104*a* is fitted into the fitting hole 162*a*, the main body 162 is securely fitted to the rotatable shaft 104*a* to rotate integrally with the rotatable shaft 104*a*.

The number of the legs 164 corresponds to the number of the insertion holes 127 of the inner rotor 120. Specifically, in order to reduce or minimize the influence of the torque ripple of the electric motor 104, the number of the legs 164 is different from the number of the magnetic poles and the number of the slots of the electric motor 104 and is thereby set to five (5), which is a prime number, in the present embodiment. The legs 164 axially extend from a plurality of locations (five locations in the present embodiment), respectively, on a radially outer side of the fitting hole 162*a*, which is a fitting location of the main body 162. The legs 164 are arranged one after another at equal intervals in the circumferential direction. Each leg 164 is resiliently deformable because of the resilient material and the axially elongated shape of the leg 164. When the rotatable shaft 104*a* is rotated, each leg 164 is flexed through the resilient deformation thereof in conformity with the corresponding insertion hole 127. Thereby, the leg 164 contacts an inner wall of the insertion hole 127 while absorbing circumferential dimensional errors of the insertion hole 127 and the leg 164 generated at the manufacturing. In this way, the joint member 160 transmits the drive force of the rotatable shaft 104*a* to the inner rotor 120 through the legs 164.

As shown in FIG. 5, the radial bearing 150 is shaped into a cylindrical tubular form. The radial bearing 150 is made of metal and is coated with resin. The rotatable shaft 104*a* is inserted into the inside of the radial bearing 150 such that a cylindrical inner peripheral surface 150*i* of the radial bearing 150 rotatably and slidably supports the rotatable shaft 104*a*. A portion of the radial bearing 150 is securely press fitted into a through-hole 116*e* of the pump casing 116. The radial bearing 150 is non-rotatably fixed to the pump casing 116 through this pressing fitting. Another portion of the radial bearing 150 is inserted into an inside of a cylindrical hole of the inner rotor 120, such that the cylindrical outer peripheral surface 150*o* of the radial bearing 150 rotably and slidably supports the inner rotor 120.

The high pressure fuel of the high pressure passage 106 penetrates into an area (slide surface) between the cylindrical inner peripheral surface 150*i* of the radial bearing 150 and the outer peripheral surface of the rotatable shaft 104*a* and thereafter leaks from this area (slide surface) into the joint receiving chamber 110*b* after dropping of the pressure of the high pressure fuel in this area (slide surface). Therefore, the joint receiving chamber 110*b* accumulates the fuel (intermediate pressure fuel) that has the pressure, which is lower than the pressure of the high pressure fuel of the high pressure passage 106 and is higher than the pressure of the fuel (suction fuel) of the suction passage 112*a*.

As shown in FIGS. 4 and 5, a first groove 1201 is formed in a surface of the inner rotor 120, which is axially opposed to the pump casing 116. The first groove 1201 is shaped into a ring form (annular form) and circumferentially extends about the radial bearing 150. Furthermore, a second groove 1202 is formed in an opposite surface of the inner rotor 120, which is axially opposite from the pump casing 116. The second groove 1202 is shaped into a ring form (annular form) and circumferentially extends about the radial bearing 150. An outer diameter of the second groove 1202 is the same as an outer diameter of the first groove 1201.

The high pressure fuel of the discharge passage 117 penetrates into an area (slide surface) between the inner rotor 120 and the pump casing 116 and thereafter leaks form this area (slide surface) into the first groove 1201 after dropping of the pressure of the high pressure fuel in this area (slide surface). Therefore, the first groove 1201 accumulates the fuel (intermediate pressure fuel) that has the pressure, which is lower than the pressure of the high pressure fuel of the high pressure passage 106 and is higher than the pressure of the fuel (suction fuel) of the suction passage 112*a*. The second groove 1202 is filled with the intermediate pressure fuel of the joint receiving chamber 110*b*. Since both of the first groove 1201 and the second groove 1202 are shaped into the ring form and have the same outer diameter, the pressure (the intermediate pressure) of the fuel accumulated in the first groove 1201 and the pressure (the intermediate pressure) of the fuel accumulated in the second groove 1202 are balanced with each other. Therefore, it is possible to limit tilting of the inner rotor 120, which would be otherwise caused by the intermediate pressure fuel.

Figure 6:
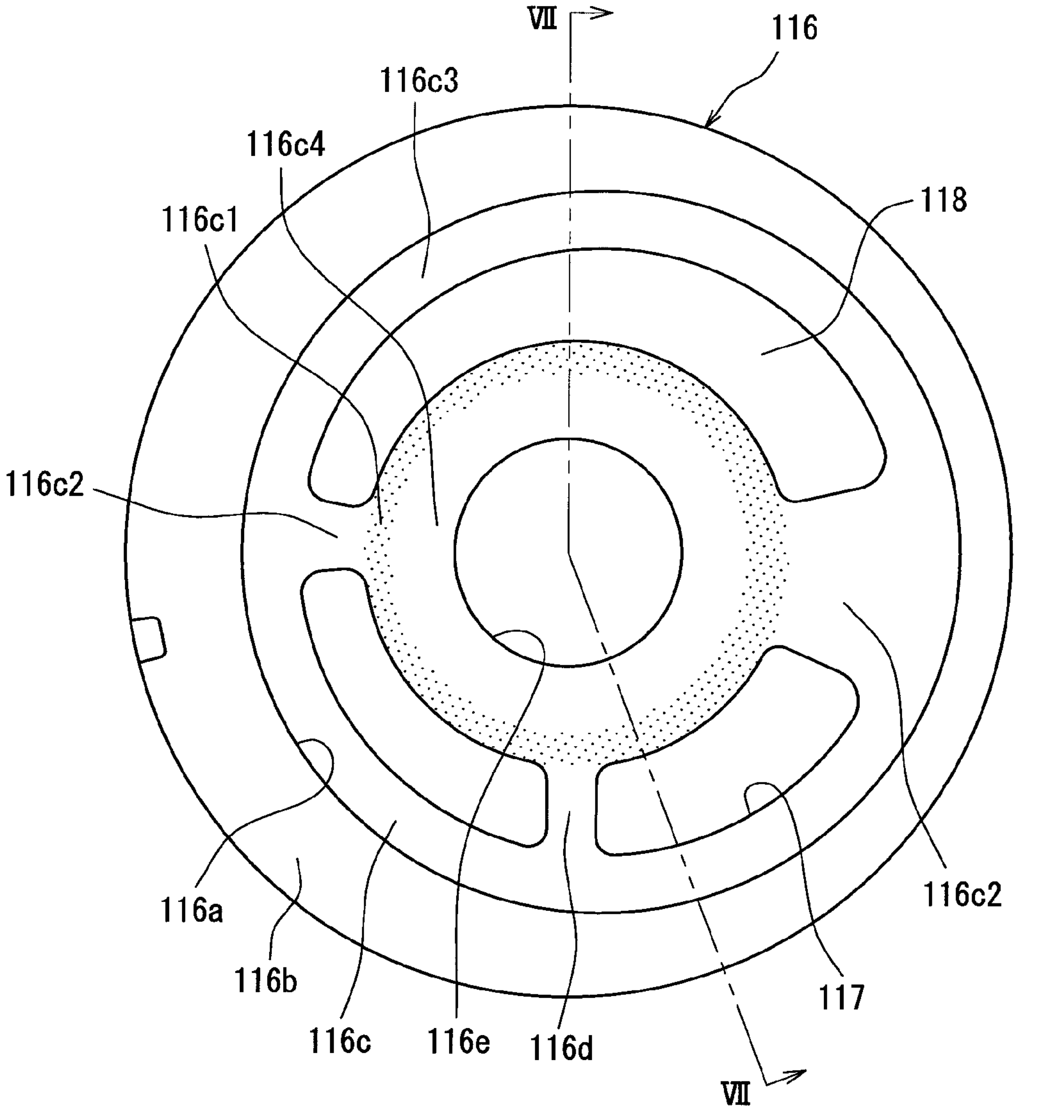
FIG. 6 is a plan view of a pump casing of the first embodiment seen from a rotor receiving chamber side.

Next, with reference to FIGS. 6 and 7, the structure of the pump casing 116 will be described in detail.

A slide surface of the recessed bottom portion 116*c* of the pump casing 116, which is slidable relative to the inner rotor 120, includes an external tooth slide surface 116*c*2 and a main body slide surface 116*c*1. The external teeth 122 of the inner rotor 120 are slidable relative to the external tooth slide surface 116*c*2. The main body 121 of the inner rotor 120 is slidable relative to the main body slide surface 116*c*1. A dotted area of FIGS. 6 and 7 indicates the main body slide surface 116*c*1. Another slide surface of the recessed bottom portion 116*c*, which is slidable relative to the internal teeth 132*a* of the outer rotor 130, is referred to as an internal tooth slide surface 116*c*3. A surface of the recessed bottom portion 116*c*, which is opposed to the first groove 1201 of the inner rotor 120, is referred to as a groove opposing surface 116*c*4.

The opposing suction groove 118 and the discharge passage 117 are formed in a rotational path range of the external tooth slide surface 116*c*2 in the recessed bottom portion 116*c*. Therefore, each corresponding portion of the recessed bottom portion 116*c*, which is circumferentially located between the opposing suction groove 118 and the discharge passage 117, serves as the external tooth slide surface 116*c*2.

The groove opposing surface 116*c*4 is formed in an annular region, which circumferentially extends along a peripheral edge of the through-hole 116*e*. The groove opposing surface 116*c*4 is not slidable relative to the inner rotor 120. The main body slide surface 116*c*1 is formed in an annular range, which is radially located between the rotational path range of the external tooth slide surface 116*c*2 and the groove opposing surface 116*c*4. In other words, the main body slide surface 116*c*1 is located in the range, which is on the radially inner side of the opposing suction groove 118 and the discharge passage 117 in the radial direction of the rotational axis and is on the radially outer side of the first groove 1201 in the radial direction of the rotational axis. The main body slide surface 116*c*1, the external tooth slide surface 116*c*2, the internal tooth slide surface 116*c*3, and the groove opposing surface 116*c*4 are placed on a common plane.

The recessed bottom portion 116*c* is processed through a surface treatment such that a surface roughness of the main body slide surface 116*c*1 is higher than a surface roughness of the external tooth slide surface 116*c*2. Specifically, first, all of the main body slide surface 116*c*1, the external tooth slide surface 116*c*2, the internal tooth slide surface 116*c*3 and the groove opposing surface 116*c*4 are cut with a lath (a cutting process). Thereafter, the main body slide surface 116*c*1 and the groove opposing surface 116*c*4 are processed by electrical discharge machining (an electrical discharge machining process). In this electrical discharge machining process, the external tooth slide surface 116*c*2 and the internal tooth slide surface 116*c*3 are not processed by the electrical discharge machining.

Figure 7:
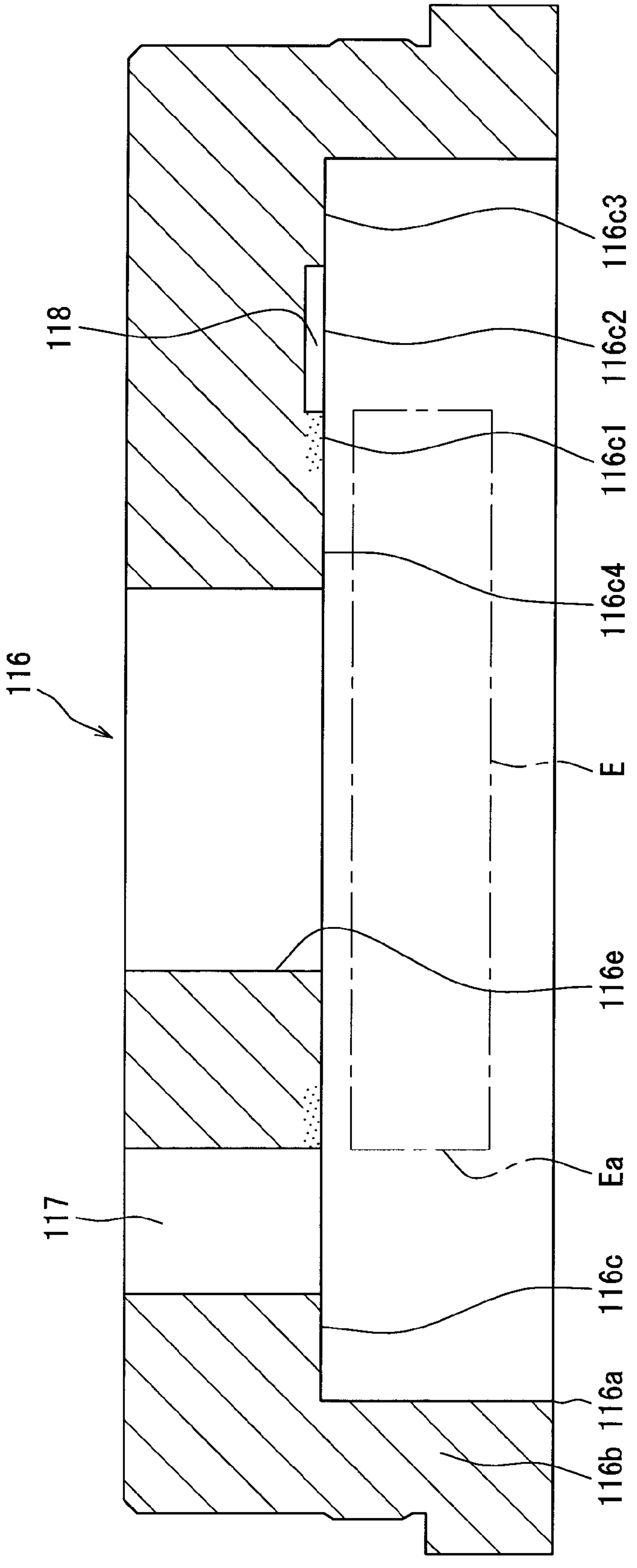
FIG. 7 is a cross-sectional view taken along line VII-VII in FIG. 6.

For example, at the time of processing the recessed bottom portion 116*c* with an electrode E, which is shaped into a circular disk form and is indicated by a dot-dash line in FIG. 7, an outer diameter of the electrode E is set to be the same as a diameter of the main body slide surface 116*c*1. Specifically, a radial location of an outer peripheral surface (a radially outer end surface) Ea of the electrode E is set to coincide with a radial location of an outer peripheral edge of the main body slide surface 116*c*1. In this way, the main body slide surface 116*c*1 can be processed by the electrical discharge machining without processing the external tooth slide surface 116*c*2 by the electrical discharge machining.

Now, a procedure of the electrical discharge machining process will be described. First of all, the electrode E is placed to contact the recessed bottom portion 116*c*. Next, the electrode E is spaced away from the recessed bottom portion 116*c* by a predetermined distance to place the electrode E in a state shown in FIG. 7. Then, a voltage is applied to the electrode E to generate electrical discharges (sparks) between the pump casing 116 and the electrode E. Thereby, a portion of the recessed bottom portion 116*c*, which is opposed to the electrode E, i.e., the main body slide surface 116*c*1 and the groove opposing surface 116*c*4 are processed by the electrical discharge machining. However, the other portion of the recessed bottom portion 116*c*, which is not opposed to the electrode E, i.e., the external tooth slide surface 116*c*2 and the internal tooth slide surface 116*c*3 are not processed by the electrical discharge machining.

Next, there will be described the technical significance of processing the main body slide surface 116*c*1 by the electrical discharge machining without processing the external tooth slide surface 116*c*2 by the electrical discharge machining.

Figure 8:
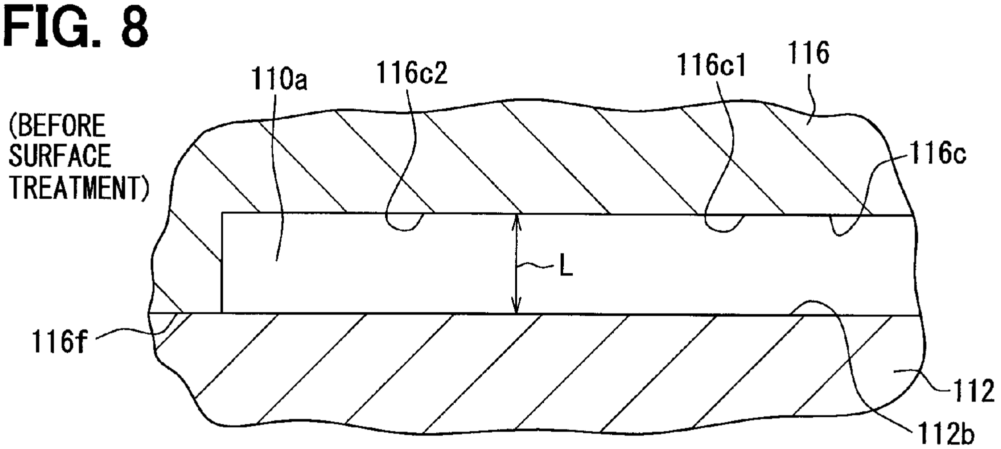
FIG. 8 is a schematic cross sectional view for describing an axial dimension of the rotor receiving chamber in a state before surface treatment of the pump casing.

As shown in FIG. 8, in the state before execution of the electrical discharge machining process, the pump casing 116 and the pump cover 112 are cut with the lath in the cutting process such that an axial dimension L of the rotor receiving chamber 110*a* is within a predetermined dimensional tolerance. Specifically, the contact surface 116*f* (see FIG. 5) of the pump casing 116, which contacts the pump cover 112, a top surface 112*b* of the pump cover 112, the recessed bottom portion 116*c* are cut such that a surface roughness is within a first predetermined value Ra1. A value, which is defined by, for example, arithmetic mean deviation of the profile, is used as the first predetermined value Ra1.

The first predetermined value Ra1 is set such that a required sealing performance is achieved between the contact surface 116*f* of the pump casing 116 and the top surface 112*b* of the pump cover 112. Furthermore, the first predetermined value Ra1 is also set such that the sufficient sealing performance is achieved between the external tooth slide surface 116*c*2 and the external teeth 122 and also between the internal tooth slide surface 116*c*3 and the internal teeth 132*a*.

Figure 9:
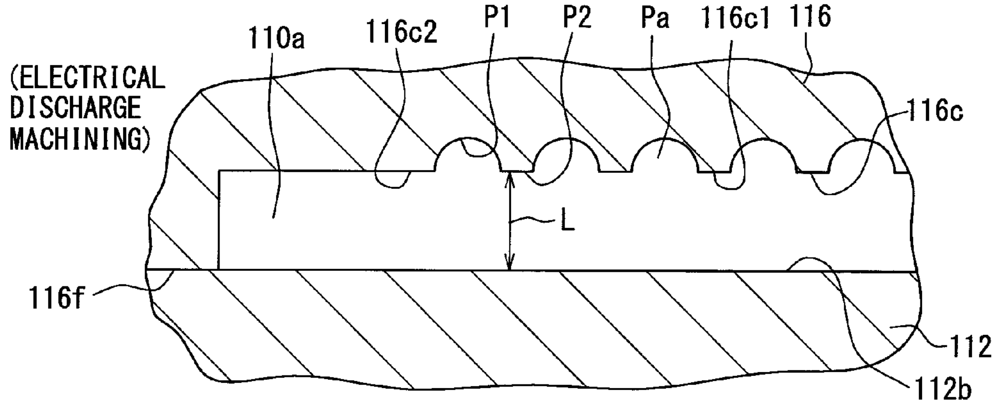
FIG. 9 is a schematic cross sectional view for describing an axial dimension of the rotor receiving chamber in a case where the pump casing is processed by electrical discharge machining.

With reference to FIG. 9, for example, a clearance distance (discharge distance) between the recessed bottom portion 116*c* and the electrode E, a discharge electric power, a discharge frequency, and a discharge time period are set such that the surface roughness of the processed surface, which is processed through the electrical discharge machining, becomes higher than the surface roughness of the unprocessed surface, which is not processed through the electrical discharge machining. In other words, the main body slide surface 116*c*1 is processed by the electrical discharge machining such that the surface roughness of the main body slide surface 116*c*1 becomes equal to or larger than a second predetermined value Ra2. The second predetermined value Ra2 is set to be a value that is larger than the first predetermined value Ra1.

With this setting, the surface roughness of the main body slide surface 116*c*1 becomes higher than the surface roughness of the external tooth slide surface 116*c*2. That is, the surface roughness of the external tooth slide surface 116*c*2 becomes less than the first predetermined value Rat and the surface roughness of the main body slide surface 116*c*1 becomes equal to or larger than the second predetermined value Ra2, and a large number of grooves Pa are formed in the main body slide surface 116*c*1. In the case where the electrical discharge machining process is executed, a surface roughness profile of the processed surface, which is processed by the electrical discharge machining process, is formed such that the grooves Pa are formed in the processed surface without substantially generating protrusions from the location of the unprocessed surface, which is the surface before the execution of the electrical discharge machining (see FIG. 9).

Therefore, in a case where an axial location of a maximum peak height Rp of the roughness profile (more specifically, an axial location of a top end of the peak having the maximum peak height Rp) is defined as a maximum peak location in each of the main body slide surface 116*c*1 and the external tooth slide surface 116*c*2, the maximum peak location (see a reference sign P2 in FIG. 9) of the main body slide surface 116*c*1 is the same as the maximum peak location of the external tooth slide surface 116*c*2. Therefore, the axial dimension L does not substantially change between the time before the execution of the electrical discharge machining process and the time after the execution of the electrical discharge machining process. Furthermore, in a case where an axial location of a maximum valley depth Rv of the roughness profile (more specifically, an axial location of a bottom end of the valley having the maximum valley depth Rv) is defined as a maximum valley location in each of the main body slide surface 116*c*1 and the external tooth slide surface 116*c*2, the maximum valley location (see a reference sign P1 in FIG. 9) of the main body slide surface 116*c*1 is spaced further away from the inner rotor 120 in comparison to the maximum valley location of the external tooth slide surface 116*c*2. Thereby, the grooves Pa are formed.

In contrast, in a case where a shot blasting process, which is a mechanical process, is used in place of the electrical discharge machining process, although the surface roughness, which is produced by the shot blasting process, may be the same as the surface roughness, which is produced by the electrical discharge machining, the surface roughness profile, which is produced by the shot blasting process, differs from the surface roughness profile, which is produced by the electrical discharge machining process as follows. That is, in the case of the shot blasting process, although the grooves Pa are formed, the surface roughness profile includes portions (protrusions Pb), which protrude from the location of the unprocessed surface that is the surface before the execution of the shot blasting process. The shot blasting process is a process of forcefully propelling blast media, which includes abrasive particles, against the subject surface to roughen the subject surface. In the subject surface, spots, against which the media collide, are depressed to form the grooves Pa. However, these spots are plastically deformed to form the grooves Pa. Therefore, each surrounding area, which surrounds the corresponding spot, is bulged.

Figure 10:
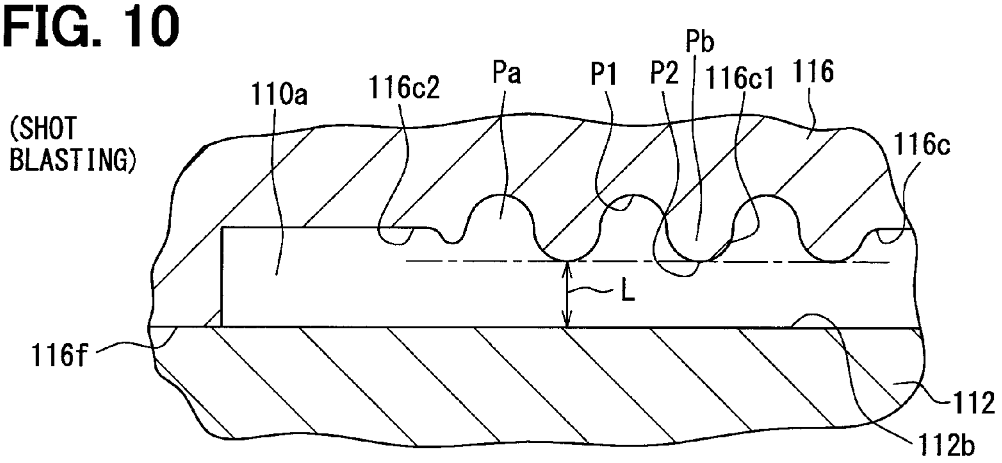
FIG. 10 is a schematic cross sectional view for describing an axial dimension of the rotor receiving chamber in a case where the pump casing is processed by shot blasting.

In such a case, as indicated by a dot-dash line in FIG. 10, the maximum peak location (see the reference sign P2 in FIG. 10) of the main body slide surface 116*c*1 is placed to be closer to the inner rotor 120 in comparison to the maximum peak location of the external tooth slide surface 116*c*2. Therefore, the axial dimension L after the time of executing the shot blasting process is reduced in comparison to the axial dimension L before the time of executing shot blasting process. Thus, the axial dimension L substantially changes between the time before the execution of the shot blasting process and the time after the execution of the shot blasting process.

Now, advantages of the present embodiment will be described.

When the temperature of the fuel is low to have the high viscosity, the tilting force is applied to the inner rotor 120. With respect to the above-described disadvantage, according to the present embodiment, the inner rotor 120 is coupled to the rotatable shaft 104*a* through the joint member 160, so that the above-described tilting force is absorbed through the resilient deformation of the joint member 160, and thereby the slide resistance between the radial bearing 150 and the rotatable shaft 104*a* is reduced.

Furthermore, according to the present embodiment, the surface roughness of the main body slide surface 116*c*1 is higher than the surface roughness of the external tooth slide surface 116*c*2. Therefore, since the external tooth slide surface 116*c*2 has the low surface roughness, it is possible to have the sufficient sealing performance between the external teeth 122 of the inner rotor 120 and the external tooth slide surface 116*c*2. The main body slide surface 116*c*1 has the high surface roughness, so that the fuel can penetrate into the area (the grooves Pa) between the main body 121 of the inner rotor 120 and the main body slide surface 116*c*1 to implement the lubricating function. Therefore, even when the main body 121 of the inner rotor 120 is urged against the main body slide surface 116*c*1 of the pump casing 116 due to the formation of the joint receiving chamber 110*b*, the lubricating function is implemented to sufficiently reduce the slide resistance.

Thereby, according to the present embodiment, there is implemented the structure, which can absorb the tilting force with the joint member 160 and can sufficiently reduce the slide resistance of the inner rotor 120.

Furthermore, in the present embodiment, the main body slide surface 116*c*1 is processed by the electrical discharge machining, so that the surface roughness of the main body slide surface 116*c*1 becomes higher than the surface roughness of the external tooth slide surface 116*c*2. In this way, the grooves Pa are formed while limiting the generation of the protrusions Pb shown in FIG. 10. Thus, the decrease of the axial dimension L can be limited by the electrical discharge machining, and thereby the rotor receiving chamber 110*a* having the high dimensional accuracy can be provided.

Furthermore, in the present embodiment, in the case where the axial location of the maximum peak height Rp of the roughness profile (more specifically, the axial location of the top end of the peak having the maximum peak height Rp) is defined as the maximum peak location in each of the main body slide surface 116*c*1 and the external tooth slide surface 116*c*2, the maximum peak location of the main body slide surface 116*c*1 is the same as the maximum peak location of the external tooth slide surface 116*c*2. Therefore, the axial location of the main body slide surface 116*c*1 can be set to be the same as the axial location of the external tooth slide surface 116*c*2. Thus, the excessive increase of the slide resistance of the main body 121 and the external teeth 122 can be limited, and the sufficient sealing performance can be obtained.

Second Embodiment

In the first embodiment, the surface roughness of the portion of the slide surface of the pump casing 116 is increased to implement the lubricating function. Thereby, the provision of the joint member 160 and the decrease of the slide resistance of the inner rotor 120 are both achieved. In the present embodiment, a surface roughness of a portion of the inner rotor 120 is increased to implement the lubricating function.

Figure 11:
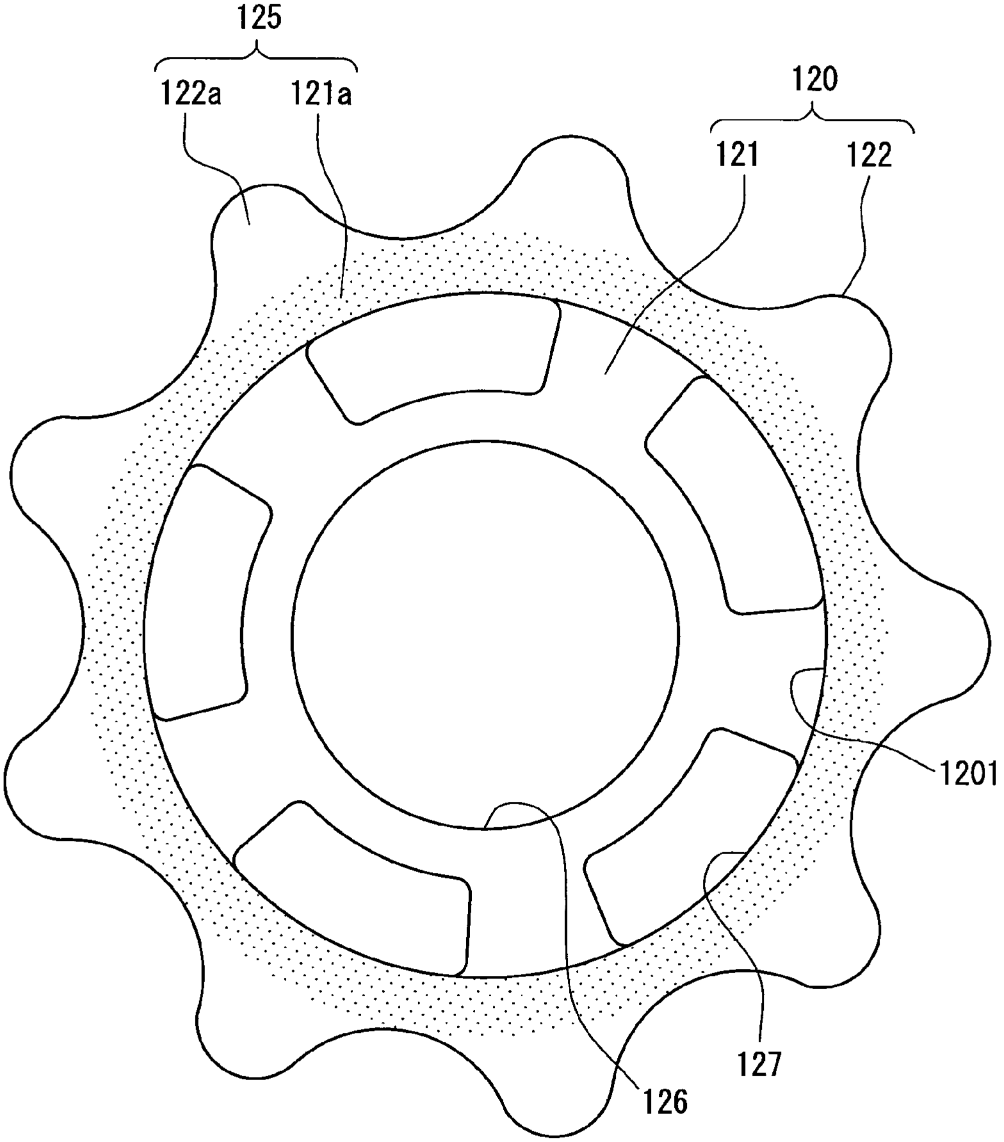
FIG. 11 is a plan view of an inner rotor of a fuel pump according to a second embodiment of the present disclosure.

As shown in FIG. 11, similar to the first embodiment, the inner rotor 120 has the main body 121 and the external teeth 122. Similar to the first embodiment, the first groove 1201 and the insertion holes 127 are formed in the main body 121. The slide surface 125 of the inner rotor 120, which is slidable relative to the recessed bottom portion 116*c* of the pump casing 116, is divided into an external tooth slide surface 122*a*, which is formed by the external teeth 122, and a main body slide surface 121*a*, which is formed by the main body 121. The external tooth slide surface 122*a* serves as a rotor side external tooth slide surface of the present disclosure, and the main body slide surface 121*a* serves as a rotor side main body slide surface of the present disclosure. The main body slide surface 121*a* is a dotted area of FIG. 11 and is located between the first groove 1201 and the external teeth 122 in the radial direction.

The external tooth slide surface 122*a* and the main body slide surface 121*a* are located in a common plane. The slide surface 125 is processed through a surface treatment such that a surface roughness of the main body slide surface 121*a* is higher than a surface roughness of the external tooth slide surface 122*a*. Specifically, first, all of the main body slide surface 121*a* and the external tooth slide surface 122*a* are cut with a lath (a cutting process). Thereafter, the main body slide surface 121*a* is processed by the electrical discharge machining (an electrical discharge machining process). In this electrical discharge machining process, the external tooth slide surface 122*a* is not processed by the electrical discharge machining. For example, the main body slide surface 121*a* can be processed by the electrical discharge machining without processing the external tooth slide surface 122*a* by executing the electrical discharge machining process with an electrode having a shape that corresponds to the main body slide surface 121*a*.

Thereby, according to the present embodiment, the surface roughness of the main body slide surface 121*a* is higher than the surface roughness of the external tooth slide surface 122*a*. Thus, since the surface roughness of the external tooth slide surface 122*a* is small, it is possible to implement the sufficient sealing performance between the external tooth slide surface 116*c*2 of the pump casing 116 and the external tooth slide surface 122*a* of the inner rotor 120. Furthermore, the main body slide surface 121*a* has the high surface roughness, so that the fuel can penetrate into the area (the grooves) between the main body slide surface 116*c*1 of the pump casing 116 and the main body slide surface 121*a* of the inner rotor 120 to implement the lubricating function. Therefore, even when the main body 121 of the inner rotor 120 is urged against the main body slide surface 121*a* of the pump casing 116 due to the formation of the joint receiving chamber 110*b*, the lubricating function is implemented to sufficiently reduce the slide resistance.

Thereby, according to the present embodiment, there is implemented the structure, which can absorb the tilting force with the joint member 160 and can sufficiently reduce the slide resistance of the inner rotor 120.

Furthermore, in the present embodiment, the main body slide surface 121*a* is processed by the electrical discharge machining, so that the surface roughness of the main body slide surface 121*a* becomes higher than the surface roughness of the external tooth slide surface 122*a*. In this way, the grooves Pa shown in FIG. 9 are formed in the inner rotor 120 while limiting the generation of the protrusions Pb shown in FIG. 10. Thus, the decrease of the axial dimension L can be limited by the electrical discharge machining, and thereby the rotor receiving chamber 110_a_ having the high dimensional accuracy can be provided.

Other Embodiments

The present disclosure has been described with respect to the above embodiments. However, the present disclosure is not limited to the above embodiments, and the above embodiments may be modified in various ways within a principal of the present disclosure.

In the embodiment shown in FIG. 7, the electrode E, which is shaped into the circular disk form, is used for the electrical discharge machining process. Alternative to this electrode E, an electrode, which is shaped into a ring form (annular form) having a through-hole at the center thereof, may be used. In the case where the electrode E is shaped into the circular disk form shown in FIG. 7, the groove opposing surface 116_c_4 is also processed by the electrical discharge machining in addition to the main body slide surface 116_c_1. However, the groove opposing surface 116_c_4, which does not need to be processed by the electrical discharge machining, is also processed by the electrical discharge machining, and thereby the electrical discharges (sparks) are also applied to the through-hole 116_e_, which does not require the electrical discharges (sparks). In contrast, in the case where the electrode, which is shaped into the ring form, is used, the electrical discharges (sparks) are not applied to the through-hole 116_e_. Furthermore, when the through-hole of the electrode, which is shaped into the ring form, is positioned at the boundary between the main body slide surface 116_c_1 and the groove opposing surface 116_c_4, it is possible to avoid the processing of the groove opposing surface 116_c_4 by the electrical discharge machining. Therefore, the electric power consumption can be reduced.

In each of the above embodiments, the surface roughness of the portion of the slide surface of the pump casing 116 or the surface roughness of the portion of the slide surface of the inner rotor 20 is increased by the electrical discharge machining. However, the present disclosure is not limited to this electrical discharge machining. For example, the surface roughness of the portion of the slide surface of the pump casing 116 or the surface roughness of the portion of the slide surface of the inner rotor 20 may be increased by, for example, the shot blasting of FIG. 10. Here, it should be noted that in the case of the electrical discharge machining, the entire subject surface is cut with the lath and is thereafter processed by the electrical discharge machining. However, in the case of the shot blasting, it is desirable that the entire subject surface is processed by the shot blasting and is thereafter cut with the lath. With this procedure, it is possible to limit the change of the axial dimension L by the protrusions Pb generated by the short blasting. Furthermore, the method of increasing the surface roughness of the portion of the slide surface may be, for example, magnetic fluid polishing, electropolishing, or corrosion with etching agent besides the electrical discharge machining or the shot blasting.

In the embodiment shown in FIG. 4, the external teeth 122 and the internal teeth 132_a_ are shaped to have the trochoid tooth profile. Alternatively, the external teeth 122 and the internal teeth 132_a_ may be shaped to have any other suitable type of tooth profile, such as a cycloid tooth profile or a profile of a combination of various curved lines.

The subject fluid to be pumped with the fluid pump 101 is not limited to the light oil (diesel fuel) and may be any other liquid fuel, such as gasoline or alcohol. Furthermore, the subject fluid to be pumped with the fluid pump 101 is not limited to the fuel and may be liquid, such as hydraulic oil used in a hydraulic actuator or any of various lubricant oils. The fluid pump 101 is not limited to the fluid pump installed in the vehicle.

In the embodiment shown in FIG. 1, the present disclosure is implemented in the fluid pump 101 that has the pump main body 103 and the electric motor 104, which are integrated together. However, the electric motor 104 may not be provided in the fluid pump 101 of the present disclosure, and the electric motor 104 may be formed separately from the rest of the fluid pump 101. In the embodiment shown in FIG. 1, the inner rotor 120 is driven by the electric motor 104. Alternatively, the inner rotor 120 may be driven to rotate by a portion of a drive force for driving the vehicle, such as a drive force of a crankshaft of an internal combustion engine of the vehicle.

In the embodiment shown in FIG. 1, the discharge passage 117 is located on the opposite side of the pump housing 110, which is opposite from the suction passage 112_a_ in the axial direction. Alternatively, the discharge passage 117 and the suction passage 112_a_ may be placed on the same axial side of the pump housing 110.

What is claimed is:

1. A fluid pump comprising:

a rotatable shaft;

an inner rotor that includes:

- a main body that has a through-hole, through which the rotatable shaft is inserted; and
- a plurality of external teeth that are formed in an outer peripheral portion of the main body;

a joint member that is placed on an axial side of the inner rotor and couples between the inner rotor and the rotatable shaft to transmit a rotational torque of the rotatable shaft to the inner rotor;

an outer rotor that has a plurality of internal teeth for meshing with the plurality of external teeth;

a pump housing that forms:

- a rotor receiving chamber that receives the outer rotor and the inner rotor;
- a joint receiving chamber that receives the joint member; and
- a plurality of pump chambers between the plurality of internal teeth and the plurality of external teeth, wherein each of the plurality of pump chambers draws and compresses fluid by changing a volume of the pump chamber; and an external tooth slide surface and a main body slide surface that are formed in a portion of an inside wall surface of the pump housing located on an opposite side of the inner rotor, which is opposite from the joint member in an axial direction, wherein the plurality of external teeth of the inner rotor is slidable relative to the external tooth slide surface while the main body of the inner rotor is slidable relative to the main body slide surface, and a surface roughness of the main body slide surface is higher than a surface roughness of the external tooth slide surface.

2. The fluid pump according to claim 1, wherein the main body slide surface is formed through electrical discharge machining such that the surface roughness of the main body slide surface becomes higher than the surface roughness of the external tooth slide surface.

3. The fluid pump according to claim 1, wherein:

an axial location of a maximum peak height of a roughness profile is defined as a maximum peak location in each of the main body slide surface and the external tooth slide surface; and the maximum peak location of the main body slide surface is the same as the maximum peak location of the external tooth slide surface.

4. A fluid pump comprising:

a rotatable shaft;

an inner rotor that includes:

a main body that has a through-hole, through which the rotatable shaft is inserted; and a plurality of external teeth that are formed in an outer peripheral portion of the main body;

a joint member that is placed on an axial side of the inner rotor and couples between the inner rotor and the rotatable shaft to transmit a rotational torque of the rotatable shaft to the inner rotor;

an outer rotor that has a plurality of internal teeth for meshing with the plurality of external teeth;

a pump housing that forms:

a rotor receiving chamber that receives the outer rotor and the inner rotor;

a joint receiving chamber that receives the joint member; and a plurality of pump chambers between the plurality of internal teeth and the plurality of external teeth, wherein each of the plurality of pump chambers draws and compresses fluid by changing a volume of the pump chamber; and an external tooth slide surface and a main body slide surface that are formed in a portion of an inside wall surface of the pump housing located on an opposite side of the inner rotor, which is opposite from the joint member in an axial direction, wherein the plurality of external teeth of the inner rotor is slidable relative to the external tooth slide surface while the main body of the inner rotor is slidable relative to the main body slide surface, and a surface roughness of a rotor side main body slide surface of the main body, which is slidable relative to the main body slide surface, is higher than a surface roughness of a rotor side external tooth slide surface of the plurality of external teeth, which is slidable relative to the external tooth slide surface.

* * * * *